(12) United States Patent
Shetty

(10) Patent No.: US 11,601,427 B2
(45) Date of Patent: Mar. 7, 2023

(54) DYNAMIC SERVICE MANAGEMENT USING VOICE-ACTIVATED DEVICES

(71) Applicant: VMWARE, INC., Pato Alto, CA (US)

(72) Inventor: Rohit Pradeep Shetty, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 364 days.

(21) Appl. No.: 17/016,514

(22) Filed: Sep. 10, 2020

(65) Prior Publication Data

US 2022/0038456 A1 Feb. 3, 2022

(30) Foreign Application Priority Data

Jul. 28, 2020 (IN) .............................. 202041032300

(51) Int. Cl.
*H04L 29/06* (2006.01)
*H04L 9/40* (2022.01)

(52) U.S. Cl.
CPC ...... *H04L 63/0876* (2013.01); *H04L 63/0861* (2013.01)

(58) Field of Classification Search
None
See application file for complete search history.

(56) References Cited

U.S. PATENT DOCUMENTS

| | | | | |
|---|---|---|---|---|
| 9,563,761 | B1* | 2/2017 | Ziraknejad | G06F 21/32 |
| 10,063,542 | B1* | 8/2018 | Kao | G10L 17/06 |
| 10,733,601 | B1* | 8/2020 | Osborn | G06Q 20/3227 |
| 10,992,670 | B1* | 4/2021 | Drooger | H04L 63/0428 |
| 2013/0024690 | A1* | 1/2013 | Bhagavatula | H04L 67/55 |
| | | | | 713/168 |
| 2014/0279528 | A1* | 9/2014 | Slaby | G06F 1/163 |
| | | | | 455/411 |
| 2017/0180348 | A1* | 6/2017 | Piccolotto | G06F 21/32 |
| 2017/0295174 | A1* | 10/2017 | Kim | H04L 63/0861 |
| 2017/0323130 | A1* | 11/2017 | Dickinson | G06V 40/1306 |

FOREIGN PATENT DOCUMENTS

| | | | | |
|---|---|---|---|---|
| CN | 107046524 | * | 8/2017 | |
| EP | 3435620 A1 | * | 1/2019 | |
| WO | WO-2015200521 A1 | * | 12/2015 | ......... H04L 63/0492 |

OTHER PUBLICATIONS

Vaghasiya et al., "Mobile Based Trigger System Using Near Ultrasonic Waves", 2018 International Conference on Smart City and Emerging Technology (ICSCET), DOI: 10.1109/ICSCET.2018.8537280. (Year: 2018).*

* cited by examiner

*Primary Examiner* — Piotr Poltorak
(74) *Attorney, Agent, or Firm* — Thomas Horstemeyer, LLP

(57) ABSTRACT

Disclosed are various aspects of voice skill session lifetime management. In some examples, an inaudible sonic check-in announcement is detected. An inaudible sonic request for check-in authentication is emitted by a voice-activated device. An inaudible sonic authentication is detected. The inaudible sonic authentication includes a service provider identifier. The inaudible sonic check-in announcement is identified as authentic based on task data retrieved based on the service provider identifier. An inaudible sonic approval to perform a task specified in the task data is emitted by the voice-activated device.

20 Claims, 5 Drawing Sheets

DYNAMIC SERVICE MANAGEMENT USING VOICE-ACTIVATED DEVICES

RELATED APPLICATIONS

Benefit is claimed under 35 U.S.C. 119(a)-(d) to Foreign Application Serial No. 202041032300 filed in India entitled "DYNAMIC SERVICE MANAGEMENT USING VOICE-ACTIVATED DEVICES", on Jul. 28, 2020, by VMware, Inc., which is herein incorporated in its entirety by reference for all purposes.

BACKGROUND

In an enterprise setting, individuals can utilize a number of different services and applications in order to complete tasks or actions. These services can be managed through a workflow service that maintains a record of devices and users for the enterprise. Some devices can be activated using voice commands. Enterprises can require user or device authentication in order to ensure the security of enterprise data and accounts that are accessed by voice-activated devices and other devices.

Service providers and enterprises can provide on-site services or tasks that are performed by employees, autonomous vehicles, or a mixture of entities. However, once a task is issued, existing technologies can fail to account for the realities of on-site task completion. For example, users may not be aware that the task is ready to be performed. Further, users may not desire to provide unlimited or long-term access to property or other locations. These issues are present whether tasks are performed by employees or autonomous vehicles. As a result, existing technologies can result in a delay or failure to complete a task on site. In an enterprise environment, failure to complete a task can cause a cascade of failures and delays.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to dynamic service management using voice-activated devices. A workflow service can manage enterprise workflows using network services and other enterprise back ends. Voice skills, or voice-activated applications can be utilized on a voice-activated device. Service providers and enterprises can perform on-site tasks including deliveries, pick-ups, repairs, rentals, and other services or tasks. The tasks can be performed by employees, autonomous vehicles, or a mixture of entities. Users may not desire to provide unlimited or long-term access, and may not be aware that the task is ready to be performed. The user may also desire to modify or manually approve certain aspects of a task. Existing technologies can fail to appropriately handle on-site task completion. However, the present disclosure describes mechanisms that are capable of solving these issues by dynamic service management using voice-activated devices.

Figure 1:
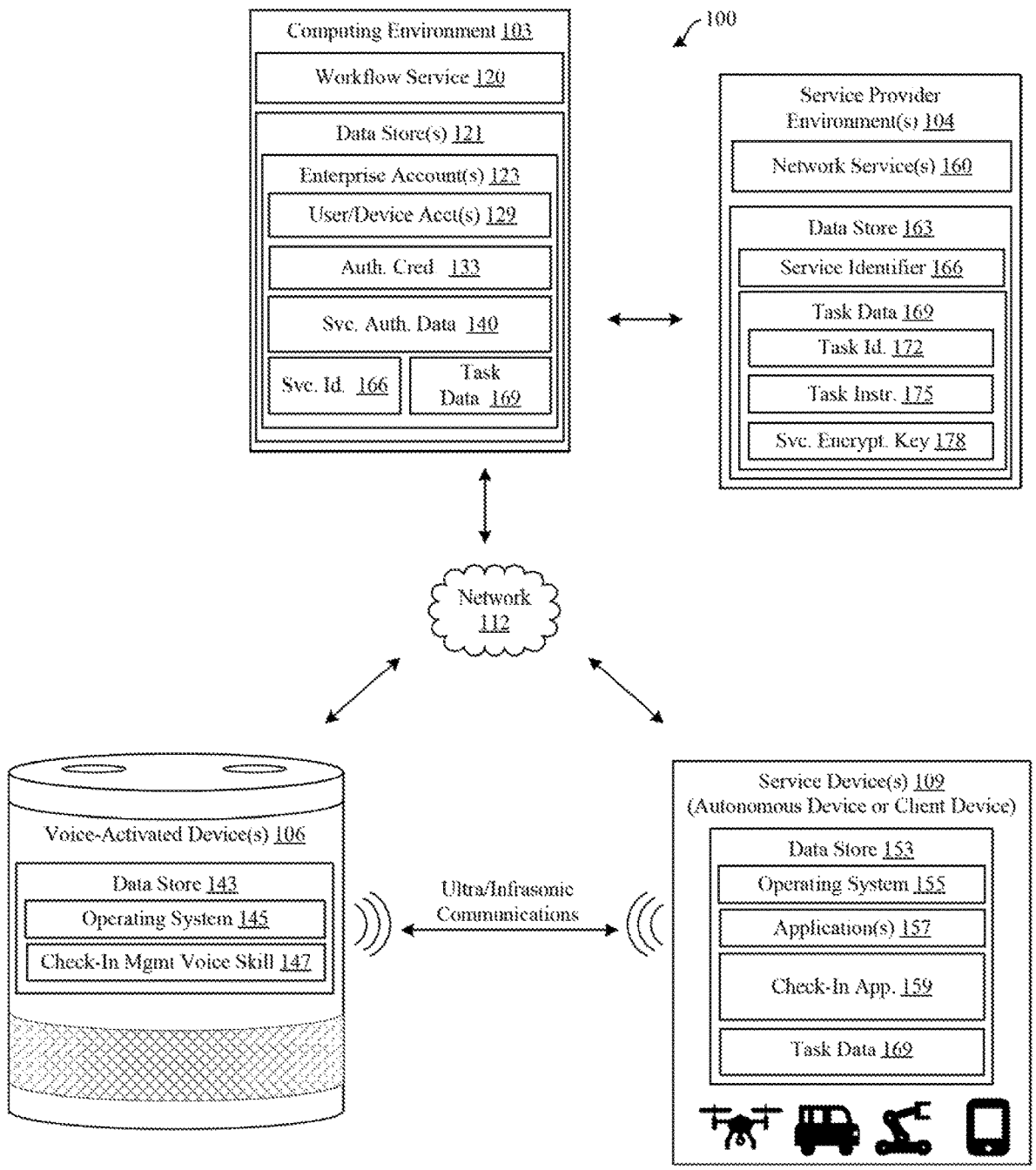
FIG. 1 is a drawing of an example of a networked environment including a workflow service, a voice-activated device, a network service, a service device, and other components in communication through a network.

With reference to FIG. 1, shown is an example of a networked environment 100. The networked environment 100 can include a computing environment 103 executing a workflow service 120, one or more service provider environments 104 executing network services 160, voice-activated devices 106, and service devices 109, in communication through a network 112.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 112 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 executing the workflow service 120 can include a server computer or any other system providing computing capability. While referred to in the singular, the computing environment 103 can include a plurality of computing devices that are arranged in one or more server banks, computer banks, or other arrangements. The computing devices of the computing environment 103 can be located in a single installation or can be distributed among many different geographical locations, local and/or remote from the other components. The computing environment 103 can include a grid computing resource or any other distributed computing arrangement. The computing environment 103 can also include or be operated as one or more virtualized computer instances. For purposes of convenience, the computing environment 103 is referred to herein in the singular. The components executed on the computing environment 103 can include a workflow service 120 as well as other applications, services, processes, systems, engines, or functionality not discussed in detail herein. The workflow service 120 can be stored in the data store 121 of the computing environment 103.

The workflow service 120 can also manage authentication with network services 160 that are utilized as backend services for the workflows. The workflow service 120 can monitor one or more network services 160 that provide various services or tasks. For example, the workflow service 120 can periodically query a network service 160 for notifications, updates, messages, changes, tasks to be performed, or other events. If the task data 169 for a service or task is identified for a particular account 129 or enterprise account 123, then the workflow service 120 can store the task data 169 in the data store 121. The workflow service 120 can automatically relay or transmit the task data 169 or a portion of the task data 169 to a voice-activated device 106 associated with the particular account 129 or enterprise account 123. Alternatively, the workflow service 120 can authenticate the voice-activated device 106 with the network service 160, and the voice-activated device 106 can request the task data 169 from the network service 160. In some examples, the task data 169 is relayed by the workflow service 120 upon receiving a request from the voice-activated device 106.

The workflow service 120 can include authentication functionality, which can include retrieving, caching or storing service authentication data 140 provided by various network services 160. The service authentication data 140 can be used to query the network services 160 for information. In some embodiments, use of the workflow service 120 can be invisible to the user. In other embodiments, the user may be asked to opt-in to the use of authentication services of the workflow service 120 through a web-portal, or other user interface. Such a web-portal or other user interface can be provided, for example, by the workflow service 120.

The workflow service 120 can also automatically handle authentication with a network service 160 utilized by the check-in management voice skill 147. The operating system 145 or other instructions executed by the voice-activated device 106 can provide audio detected by the voice-activated device 106 to the check-in management voice skill 147. The check-in management voice skill 147 can monitor this audio data for predetermined voice commands and other sonic commands, including inaudible sonic commands. Inaudible sonic commands can include ultrasonic and infrasonic communications that are generally inaudible to humans. The check-in management voice skill 147 can also monitor audio data to provide other functionalities such as natural language transcription. The operating system 145 or other instructions executed by the voice-activated device 106 can launch the check-in management voice skill 147 in response to a predetermined sonic or voice command.

The data store 121 can include any storage device or medium that can contain, store, or maintain the instructions, logic, or applications described herein for use by or in connection with the computing environment 103. The data store 121 can be a hard drive or disk of a host, server computer, or any other system providing storage capability. While referred to in the singular, the data store 121 can include a plurality of storage devices that are arranged in one or more hosts, server banks, computer banks, or other arrangements. The data store 121 can include any one of many physical media, such as magnetic, optical, or semiconductor media. More specific examples include solid-state drives or flash memory.

The data store 121 can include memory of the computing environment 103, mass storage resources of the computing environment 103, or any other storage resources on which data can be stored by the computing environment 103. The data stored in the data store 121 can include, for example, a number of enterprise accounts 123, each of which can be associated with accounts 129, service authentication data 140, service identifiers 166, task data 169, and other data. The data stored in the data store 121 can be associated with the operation of the various applications and/or functional entities described herein.

The accounts 129 can be associated with specific subsets of service authentication data and other authentication data. An account 129 can include one or more authentication credentials 133, such as the single sign-on tokens, as well as stored or cached access tokens, refresh tokens, and others. Other information about the user can also be stored as part of the account 129, such as the user's (or device's) name, email address, contact information, enterprise role, and voice-activated device identifier and location. The role can include ability to request and approve particular tasks or types of tasks from a service provider environment 104. In some cases, an account 129 can include a device account for a voice-activated device 106 that can have a particular role or responsibility.

An account 129 can also include access permissions that indicate computing resources that the user or device is authorized to access. For example, the access permissions can indicate that an account is permitted to access some network services 160 but is prohibited from accessing other network services 160. As another example, the access permissions can indicate that the account 129 is allowed to access certain services, features, or tasks of a network service 160, but prohibited from accessing other features. For example, if one of the network services 160 that a user was permitted to access was a product delivery service, the user (or device) might have permission to accept one category of products associated with the user's role but be prohibited from ordering or accepting another category of products. For example, a loading dock user or voice-activated device 106 may be enabled to accept industrial equipment or large palleted packages, while an office user or voice-activated device 106 may be enabled to accept hand-delivered items.

The user or device account 129 can identify device data for associated voice-activated devices 106 and other client devices and equipment, such as access control devices. An access control device can refer to an electronically operated lock, door, gate, window, slot, or other device. Device data can include one or more of a device identifier, a unique device identifier (UDID), a media access control (MAC) address, an internet protocol (IP) address, or another identifier that uniquely identifies a device with respect to other devices. The device data can include device specifications, and a type of each service device 109. Specifications for the service device 109 can include a hardware configuration that specifies a chipset identifier, a video card identifier, a memory identifier, a monitor or screen identifier, an input device identifier, and a peripheral identifier for each peripheral utilized by the service device 109. Specifications for the service device 109 can include a software configuration that specifies an application identifier for each application installed on the service device 109, a driver or driver version for the hardware device and peripheral of the service device 109, an operating system 155 or operating system version installed on the service device 109, and other information. The account 129 can also include an organizational group of the account 129 or of the service device 109.

The service provider environment 104 executing the network service 160 can include a server computer or any other system providing computing capability for a service provider. The service provider can include an enterprise that offers a service to users associated with the voice-activated device 106. The service provider can also include an enterprise that employs a user of the voice-activated device 106 or otherwise utilizes the voice-activated device 106.

While referred to in the singular, the service provider environment 104 can include a plurality of computing devices that are arranged in one or more server banks, computer banks, or other arrangements. The computing devices of the service provider environment 104 can be located in a single installation or can be distributed among many different geographical locations local and/or remote from the other components. The service provider environment 104 can include a grid computing resource or any other distributed computing arrangement. The service provider environment 104 can also include or be operated as one or more virtualized computer instances. For purposes of convenience, the service provider environment 104 is referred to herein in the singular. The components executed on the service provider environment 104 can include a network service 160 as well as other applications, services, processes, systems, engines, or functionality not discussed in detail herein. The network service 160 can be stored in the data store 163 of the service provider environment 104.

The network service 160 can offer, provide, and otherwise manage services or tasks that are performed by autonomous service devices 109 and users of a manual service device 109. A network service 160 can include a web application, web service, or other network facing application. The network service 160 can be federated or associated with a shared identity manager so each can be accessed using the identity manager. The identity manager can be provided by the workflow service 120 or another entity. One or more network services 160 can be provided by the same provider or by different providers. The service authentication data 140 can include information that guides authentication with the network services 160. For example, API keys, access tokens, refresh tokens, cryptographic certificates, and other network service credentials for a network service 160. The workflow service 120 can also store network endpoints or addresses associated with particular functionalities provided by a network service 160. The service authentication data 140 can also include a process or a set of steps that the workflow service 120 can perform to authenticate with a network service 160 on behalf of a user or device. The workflow service 120 can submit an authentication request to the network service 160. Once authenticated, the network service 160 can provide network service credentials and other service authentication data 140 to the workflow service 120. The workflow service 120 can store or cache the service authentication data 140 to use on behalf of a user.

The identity manager can authenticate users and manage user authorizations or permissions to access network services 160, applications, data, or other computing resources. For example, the identity manager could correspond to a single sign-on portal that verifies a user's authentication credentials 133, issues a single sign-on token that identifies the user, and verifies whether the user has the appropriate access permissions to access one or more network services 160. Examples of identity managers include AMAZON's AWS Identity and Access Management (IAM) service, VMWARE's Identity Manager, or MICROSOFT's Active Directory Federation Services. The workflow service 120 can be utilized by one or more enterprises. In some embodiments, the workflow service can be part of a local network, trusted network, or intranet, which can be separate from the other components of the networked environment 100. In some cases, an identity manager service can be part of the computing environment 103. In other cases, the identity manager service can be separate from the computing environment 103.

The data store 163 can store the network service 160, as well as a service identifier 166 and the task data 169. The service identifier 166 can uniquely identify a particular network service 160 of the network services 160. The task data 169 can include a task identifier 172, task instructions 175, and a service encryption key 178. The task identifier 172 can uniquely identify a particular task or service ticket of the network service 160. The task instructions 175 can include executable instructions as well as written, audio, and video dialog instructions that specify how a service device 109 or user of the service device 109 can perform a particular task. The task instructions 175 can also include one or more task locations such as GPS coordinates or addresses, as well as navigation instructions. The task locations can include a check-in location nearby a voice-activated device 106, which can also be referred to as a voice-activated device location. The task locations can also include a delivery location for a delivery, a pickup location for a pickup, and other locations.

The service device 109, or a user of the service device 109, can navigate to the task location. The task instructions 175 can also include task prerequisite actions that are to be performed by the voice-activated device 106 or by a user of the voice-activated device 106. The service encryption key 178 can be utilized to encrypt and decrypt inaudible sonic communications between a service device 109 and a voice-activated device 106. The service encryption key 178 can be generated and provided by the network service 160, and can be network-service-specific as well as task-specific.

The voice-activated device 106 can be representative of one or more voice-activated devices 106. The voice-activated device 106 can include a processor-based system, such as a computer system, that can include a voice-activated smart device, a voice assistant, a speaker device, a headphone device or another wearable device, or any other device with capability to produce and detect sounds. The voice-activated device 106 can encompass devices including mobile devices designed to be kept on a user, as well as stationary devices and permanent electronic fixtures of a building or another object. The voice-activated device 106 can have an operating system 145 that can perform functionalities and execute applications. The operating system 145 can be stored in a data store 143 that also includes voice skills including the check-in management voice skill 147 and other data. The voice-activated device 106 can execute the check-in management voice skill 147 to perform or access the functionality described for the workflow service 120.

The check-in management voice skill 147 can include a voice-activated application that can perform workflow actions and tasks in conjunction with the workflow service 120, a network service 160, and a check-in application of a service device 109. The voice-activated device 106 can be equipped with networking capability or networking interfaces, including a localized networking or communication capability, such as a near-field communication (NFC) capability, radio-frequency identification (RFID) read or write capability, or other localized communication capability. A voice-activated device 106 can include devices that lack or omit a screen or display device.

The operating system 145 of the voice-activated device 106 can execute various client functionalities or voice skills. The operating system 145 and the check-in management voice skill 147 can access network content served up by the computing environment 103, or other servers including the service provider environments 104, and can present this information to a user through an audio device, and can provide haptic or physical feedback using a haptic device.

The service device 109 can be representative of one or more service devices 109. Service devices 109 can include flying, driving, floating, and other autonomous vehicles that are capable of autonomously performing tasks offered by the service provider and managed using the network service 160 and/or the workflow service 120. The service devices 109 can also include a laptop computer, a personal digital assistant, a cellular telephone, a smartphone, a music player, a tablet computer system, a game console, an electronic book reader, a smartwatch, a voice-activated smart device, or any other client devices utilized for employees of the service provider to check in to perform or offer to perform tasks offered by the service provider and managed using the network service 160 and/or the workflow service 120. The workflow service 120 can manage workflows performed by the service devices 109.

The service device 109 can include a processor-based system, such as a computer system. The service device 109 can be mobile such that a user is likely to keep the service device 109 close at hand. In other words, the service device 109 can be a device that is likely to be in the presence of the user. The service device 109 can have an operating system that can perform functionalities and execute applications. The operating system 155 can be stored in a data store 153 that also includes applications 157, a check-in application 159, and other data. The service device 109 can execute the check-in application 159 to perform or access the functionality described for the workflow service 120. The service device 109 can be equipped with networking capability or networking interfaces, including a localized networking or communication capability, such as a near-field communication (NFC) capability, radio-frequency identification (RFID) read or write capability, or other localized communication capability. In some embodiments, the service device 109 is mobile, where the service device 109 is easily portable from one location to another, such as a smart phone, tablet, or laptop computer.

The operating system 155 of the service device 109 can execute various client functionalities or client applications 157, such as a check-in application 159, a browser application, a voice interaction functionality, or another application. The operating system 155 and some applications 157 can access network content served up by the computing environment 103, or other servers and can present this information to a user through one or more of the user interface devices. For example, the service device 109 can render a user interface on a display, such as a liquid crystal display (LCD), organic light emitting diode (OLED) display, touchscreen display, or another type of display device. The service device 109 can also present audio information using the audio device, and can provide haptic or physical feedback using a haptic device.

Some applications 157 can include a browser or a dedicated application, and a user interface can include a network page, an application screen, or other interface. The service device 109 can also access web applications using the browser application. Further, other applications 157 can include device management applications, enterprise applications, social networking applications, word processors, spreadsheet applications, media player applications, or other applications.

The check-in application 159 can be an application that performs certain functions in concert with the workflow service 120. The check-in application 159 can perform actions as directed by the workflow service 120, for instance, by retrieving a command from the command queue, and implementing the command as discussed above. The check-in application 159 can include a check-in functionality that is performed once the service device 109 is on-site at a location where a task is to be performed by the service device 109 or a user of the service device 109.

For example, the check-in application 159 can announce the presence of the service device 109 at the task location by causing the service device 109 to emit an inaudible sonic check-in announcement. The voice-activated device 106 can respond by emitting an inaudible sonic request for check-in authentication. The check-in application 159 can cause the service device 109 to emit an inaudible sonic check-in authentication that includes a service identifier 166 and task identifier 172. The voice-activated device 106 can determine that the check-in announcement is authentic based on the service identifier 166 and task identifier 172, perform task prerequisite actions and emit an inaudible sonic approval or command to perform the task. Inaudible sonic communications can include sonic or audio communications that are emitted at an ultrasonic or infrasonic frequency.

Figure 2:
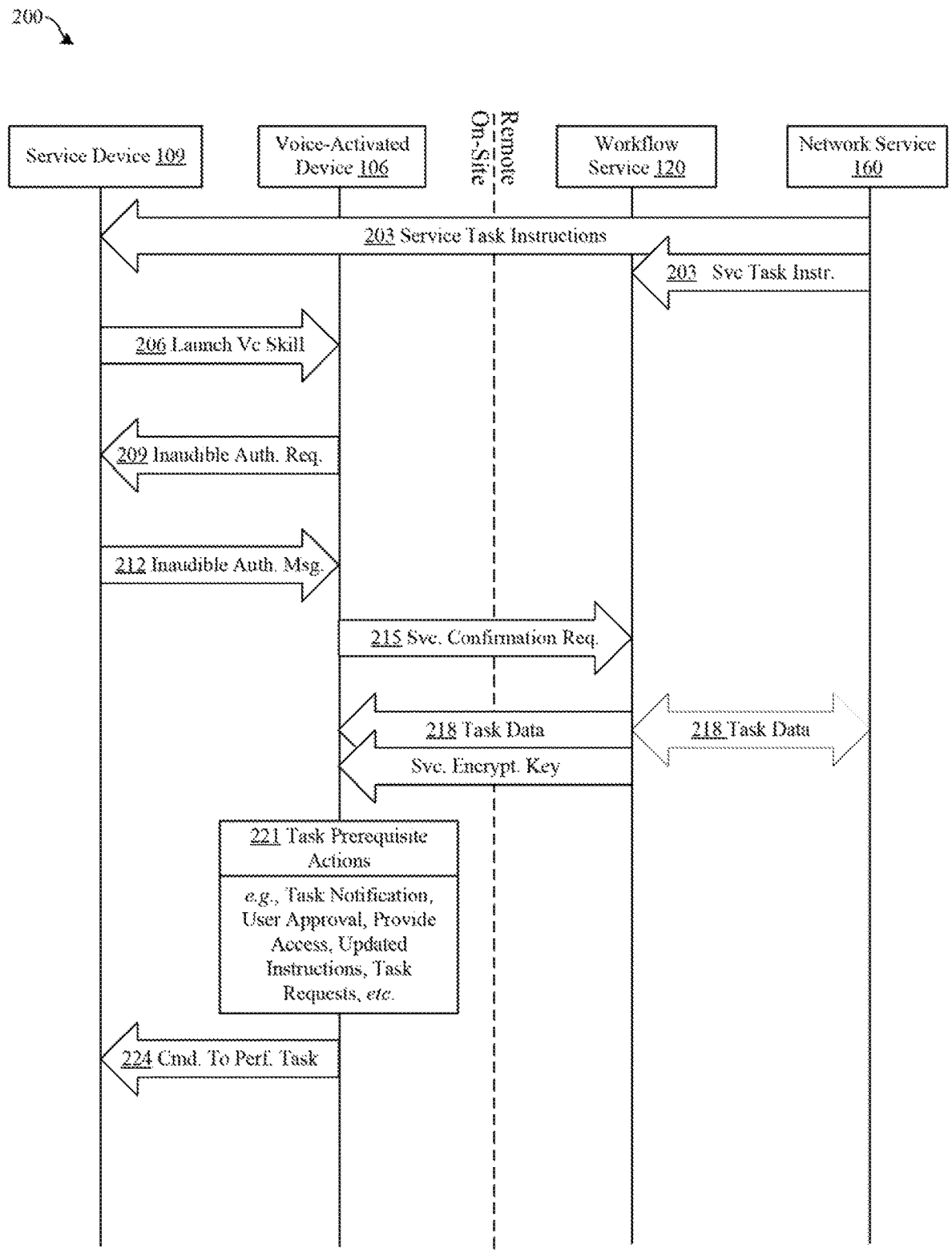
FIG. 2 is a sequence diagram outlining functionalities implemented by the workflow service and other components of the networked environment.

FIG. 2 shows an example sequence diagram 200 describing steps that can be performed by the components of the networked environment 100. The sequence diagram 200 describes a process for dynamic service management. Generally, the sequence diagram 200 describes how the voice-activated device 106 and the workflow service 120 guide the dynamic service management process once a service device 109 checks in at a task location.

In step 203, the network service 160 can transmit task data 169 to the service device 109. In some examples, the network service 160 can also transmit the task data 169 to the workflow service 120. The network service 160 can provide the task data 169 to the workflow service 120 in response to a request from the workflow service 120. In some cases, the workflow service 120 can relay the task data 169 to the voice-activated device 106 before the service device 109 arrives. Alternatively, the voice-activated device 106 can request task data 169 as part of a check-in process once the service device 109 arrives.

Task data 169 can include a task identifier 172, task instructions 175, and a service encryption key 178. The task identifier 172 can uniquely identify a particular task or service ticket of the network service 160. The task instructions 175 can include executable instructions as well as written, audio, and video dialog instructions that specify how a service device 109 or a user of the service device 109 can perform a particular task. The service encryption key 178 can be utilized to encrypt and decrypt inaudible sonic communications between a service device 109 and a voice-activated device 106. The service encryption key 178 can be generated and provided by the network service 160, and can be network-service-specific as well as task-specific.

The task instructions 175 can specify a task location, and navigation instructions for the service device 109 to navigate to the task location. In some cases, the service device 109 can include executable instructions that generate navigation instructions or retrieve navigation instructions based on the task location. For example, if the service device 109 is an autonomous driving drone, the navigation instructions can include road navigation instructions. If the service device 109 is an autonomous flying drone, then the navigation instructions can include flight navigation instructions. In some cases, the navigation instructions can include instructions for navigating to a task location in the interior of a building or other structure. If the service device 109 is a handheld device of a user that is to perform a manual service, then appropriate textual, audio, or video instructions can be provided.

Task instructions 175 can also include instructions for the service device 109 or a user of the service device 109 to perform a task or service, such as delivery or pickup of a package or pallet at the task location, surveying a task location, capturing photographs or video images of the task location, and other instructions. The task instructions 175 can also include task prerequisite actions that can be performed by a voice-activated device 106. Task prerequisite actions can include providing audible- or messaging-based notifications to a user of the voice-activated device 106, obtaining approval from a user of the voice-activated device 106, checking for updated instructions, and providing access to a secured location.

In step 206, the service device 109 can emit an inaudible sonic check-in announcement. The service device 109 can emit the inaudible sonic check-in announcement once it is in a predetermined check-in location specified in the task instructions 175. The service device 109 can navigate to the check-in location based on the task instructions 175. The check-in location can be an accessible location nearby to the known location of a voice-activated device 106.

The voice-activated device 106 can be configured to launch or otherwise initiate a check-in management voice skill 147 in response to detecting the inaudible sonic check-in announcement. As a result, the inaudible sonic check-in announcement can be considered a command to launch the check-in management voice skill 147. In situations where the task data 169 is provided to the voice-activated device 106 prior to the arrival of the service device 109, all inaudible sonic communications after the check in can be encrypted using the service encryption key 178 that is included in the task data 169. In other cases, the task data 169 is not obtained until after an authentication message and confirmation. Once both the service device 109 and the voice-activated device 106 have access to the task data 169, the inaudible sonic communications can be encrypted using the service encryption key 178 and decrypted using the service encryption key 178 once received. While symmetric encryption can be used, asymmetric encryption/decryption keys can also be used.

In step 209, the voice-activated device 106 can emit an inaudible sonic authentication request. The check-in application 159 or other executable instructions of the service device 109 can be configured to respond to the inaudible sonic authentication request.

In step 212, the service device 109 can generate and emit an inaudible sonic authentication message. The inaudible sonic authentication message can include a service identifier 166 and a task identifier 172. The service identifier 166 can be a name of the service provider, or a string or data structure that uniquely identifies the service provider. The task identifier 172 can include a name of the task or a string or data structure that uniquely identifies the task.

In step 215 the voice-activated device 106 can transmit a service confirmation request based on the service identifier 166 and the task identifier 172. For example, the voice-activated device 106 can transmit the service confirmation request to the workflow service 120 or the network service 160. The workflow service 120 can authenticate the request on behalf of the voice-activated device 106. The service confirmation request can also be referred to as a request for the task data 169.

In step 218 the network service 160 and/or the workflow service 120 can provide the task data 169 to the voice-activated device 106 in response to the request. In some examples, the network service 160 can transmit the task data 169 directly to the voice-activated device 106, and in other cases, the task data 169 can be relayed through the workflow service 120. The task data 169 can include the service encryption key 178. Both the voice-activated device 106 and the service device 109 have access to the service encryption key 178 at this point, so all further inaudible sonic communications can be encrypted and decrypted using the service encryption key 178.

The voice-activated device 106 can determine that the inaudible sonic authentication message is authentic by confirming that the task data 169 includes the task identifier 172 or otherwise specifies a task associated with the task identifier 172 of the inaudible sonic authentication message.

In step 221, the voice-activated device 106 can perform task prerequisite actions. The task prerequisite actions can include actions for the voice-activated device 106 that are specified in the task data 169 or task instructions 175. Task prerequisite actions can include providing audible- or messaging-based notifications to a user of the voice-activated device 106, obtaining approval from a user of the voice-activated device 106, checking for updated instructions, and providing access to a secured location.

The voice-activated device 106 can provide access to a secured location by transmitting a command for an access control device to temporarily unlock and/or open a door, window, lockbox, gate, slot, or latch. The voice-activated device 106 can also emit an inaudible and encrypted communication that indicates that access to the secured location is provided, as well as a time period for which the access to the secured location will be provided. 100511 in step 224, once any specified task prerequisite actions are completed, the voice-activated device 106 can emit an inaudible sonic command to perform the task. The service device 109 or a user of the service device 109 can then perform the task according to the task instructions 175 or updated instructions inaudibly communicated to the service device 109 as a task prerequisite action.

Figure 3:
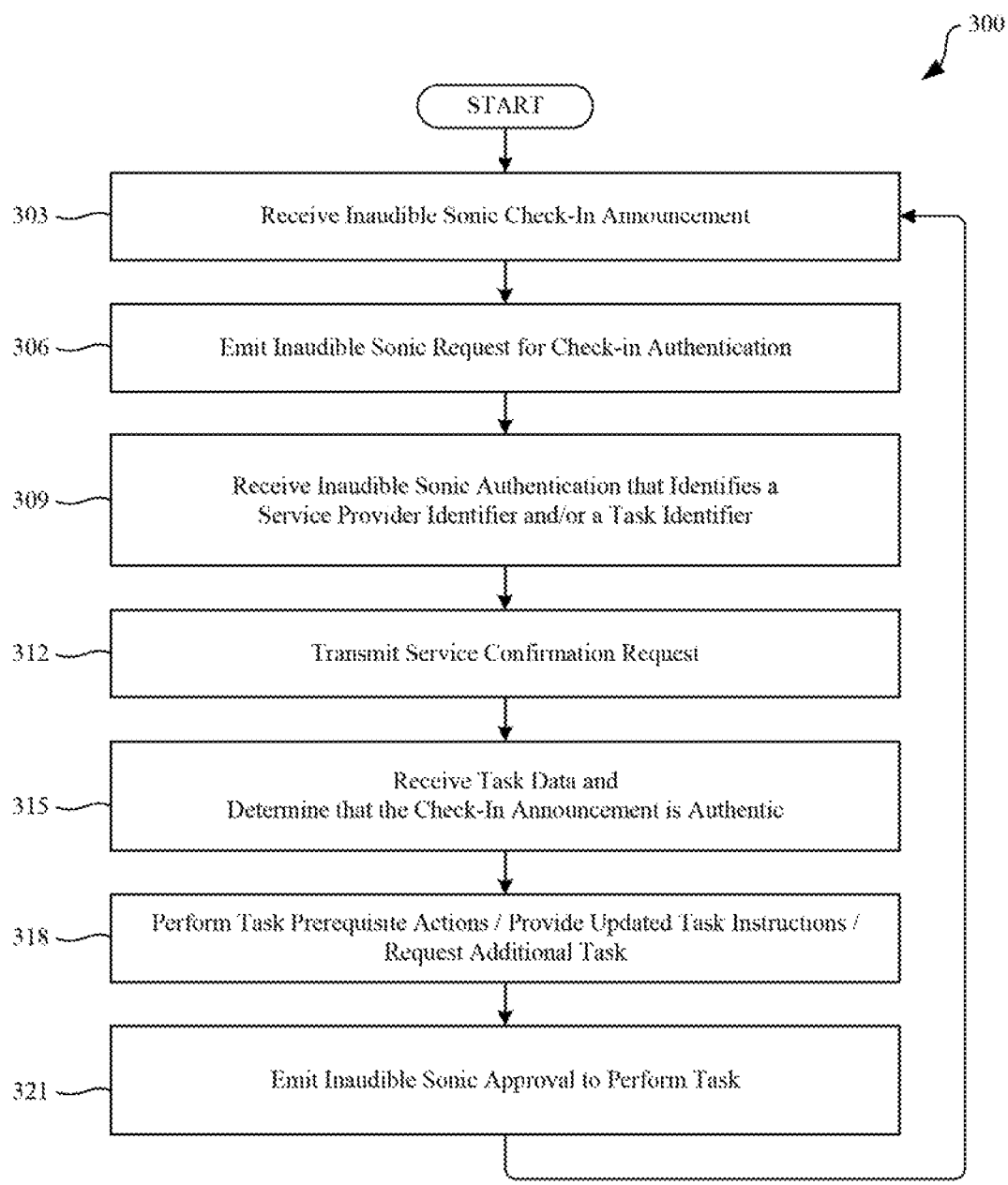
FIG. 3 is a flowchart outlining functionalities implemented by the voice-activated device and other components of the networked environment.

FIG. 3 shows an example flowchart 300 describing steps that can be performed by the voice-activated device 106. The voice-activated device 106 can execute instructions including the operating system 145, check-in management voice skill 147, and other instructions in order to perform the functionalities described in the flowchart 300. The flowchart 300 outlines how the voice-activated device 106 interacts with the other components of the networked environment 100 to provide dynamic on-site service management.

In step 303, the voice-activated device 106 can receive or detect an inaudible sonic check-in announcement. The inaudible sonic check-in announcement can include a predetermined ultrasonic or infrasonic signal that is emitted by a service device 109. This inaudible sonic check-in announcement can indicate that the service device 109 is on site to offer and/or perform a task. The operating system 145 or other instructions can be executed to launch the check-in management voice skill 147 or initiate a check-in process of the check-in management voice skill 147 in response to the inaudible sonic check-in announcement.

In step 306, the check-in management voice skill 147 can cause the voice-activated device 106 to emit an inaudible sonic request for check-in authentication. This inaudible sonic check-in authentication request can provide a measure of security, in case a bad actor has caused a device to spoof or emulate an inaudible sonic check-in announcement. Since the authentication information will be checked against information received from a trusted source such as the workflow service 120 or the network service 160, the inaudible sonic check-in authentication request can enable the voice-activated device to ensure that the inaudible sonic check-in announcement is legitimate or authentic before providing access to a location or approving a task.

In step 309, the check-in management voice skill 147 can receive an inaudible sonic authentication message. The inaudible sonic authentication message can include or specify a service identifier 166 of a service provider and a task identifier 172 of a task to be performed. If the service device 109 is offering a task, such as completing a round through a neighborhood, then the task identifier can be associated with a set of tasks being offered by the service device 109 or a user of the service device 109.

In step 312, the check-in management voice skill 147 can cause the voice-activated device 106 to transmit a service confirmation request based on the service identifier 166 and the task identifier 172. For example, the voice-activated device 106 can transmit the service confirmation request to the workflow service 120 or the network service 160. The workflow service 120 can authenticate the request on behalf of the voice-activated device 106.

In step 315, the check-in management voice skill 147 can receive task data 169 from the network service 160 or the workflow service 120. The task data 169 can confirm whether a service device 109 has been dispatched to the area of the voice-activated device 106 by the network service 160 in order to offer or perform a task associated with the task identifier 172. The task data 169 can include the service encryption key 178. Both the voice-activated device 106 and the service device 109 can have access to the service encryption key 178 at this point, so all further inaudible sonic communications can be encrypted and decrypted using the service encryption key 178.

In step 318, the check-in management voice skill 147 can perform task prerequisite actions. The task prerequisite actions can include actions for the voice-activated device 106 that are specified in the task data 169 or task instructions 175. Task prerequisite actions can include providing audible- or messaging-based notifications to a user of the voice-activated device 106, obtaining approval from a user of the voice-activated device 106, obtaining or confirming payment for the task, checking for updated instructions, and providing access to a secured location.

In some cases, a user can change task instructions. For example, the user can indicate that delivery or pickup should be completed at an updated delivery location. A user can also update a set of tasks to be performed, and other aspects of task instructions. Prior to commencing the task, the check-in management voice skill 147 can provide updated task instructions and request additional tasks that are offered by the service device 109.

In step 321, once any specified task prerequisite actions are completed, the check-in management voice skill 147 can cause the voice-activated device 106 to emit an inaudible sonic approval to perform the task or set of tasks. The service device 109 or a user of the service device 109 can then perform the task according to the task instructions 175 or updated instructions inaudibly communicated to the service device 109 as a task prerequisite action.

Figure 4:
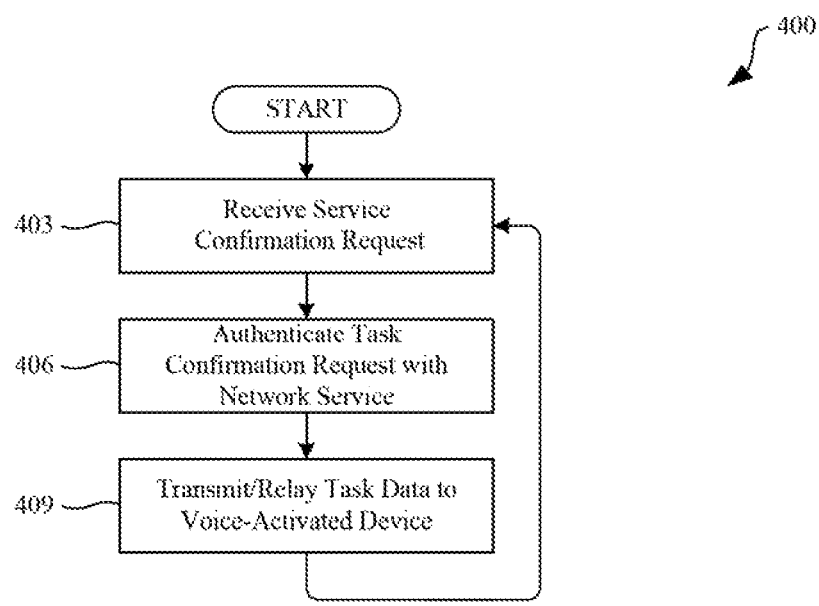
FIG. 4 is a flowchart outlining functionalities implemented by the workflow service and other components of the networked environment.

FIG. 4 shows an example flowchart 400 describing steps that can be performed by the workflow service 120 or the network service 160. The flowchart 400 outlines how the workflow service 120 interacts with the other components of the networked environment 100 to provide dynamic on-site service management.

In step 403 the workflow service 120 can receive a service confirmation request. The service confirmation request can be received from a voice-activated device 106. The service confirmation request can include the service identifier 166 and the task identifier 172. The workflow service 120 can identify an enterprise account 123 and user or device account 129 based on the service confirmation request.

In step 406, the workflow service 120 can authenticate the voice-activated device 106 or the service confirmation request on behalf of the voice-activated device 106. The workflow service 120 can identify service authentication data 140 for the network service 160 that corresponds to the service identifier 166. The service authentication data 140 can also correspond to the enterprise account 123, and the user or device account 129. The workflow service 120 can use the identified service authentication data 140 to authenticate the voice-activated device 106 or the service confirmation request with the network service 160.

In step 409, the network service 160 and/or the workflow service 120 can provide the task data 169 to the voice-activated device 106. In some examples, the network service 160 can transmit the task data 169 directly to the voice-activated device 106, and in other cases, the task data 169 can be relayed through the workflow service 120. The task data 169 can include the service encryption key 178. The voice-activated device 106 can confirm, based on the task data 169, that the network service 160 has dispatched the service device 109. In other words, the voice-activated device 106 can confirm that the service device 109 is expected based on the task data 169. The voice-activated device 106 can then perform any task prerequisite actions and approve the task.

Figure 5:
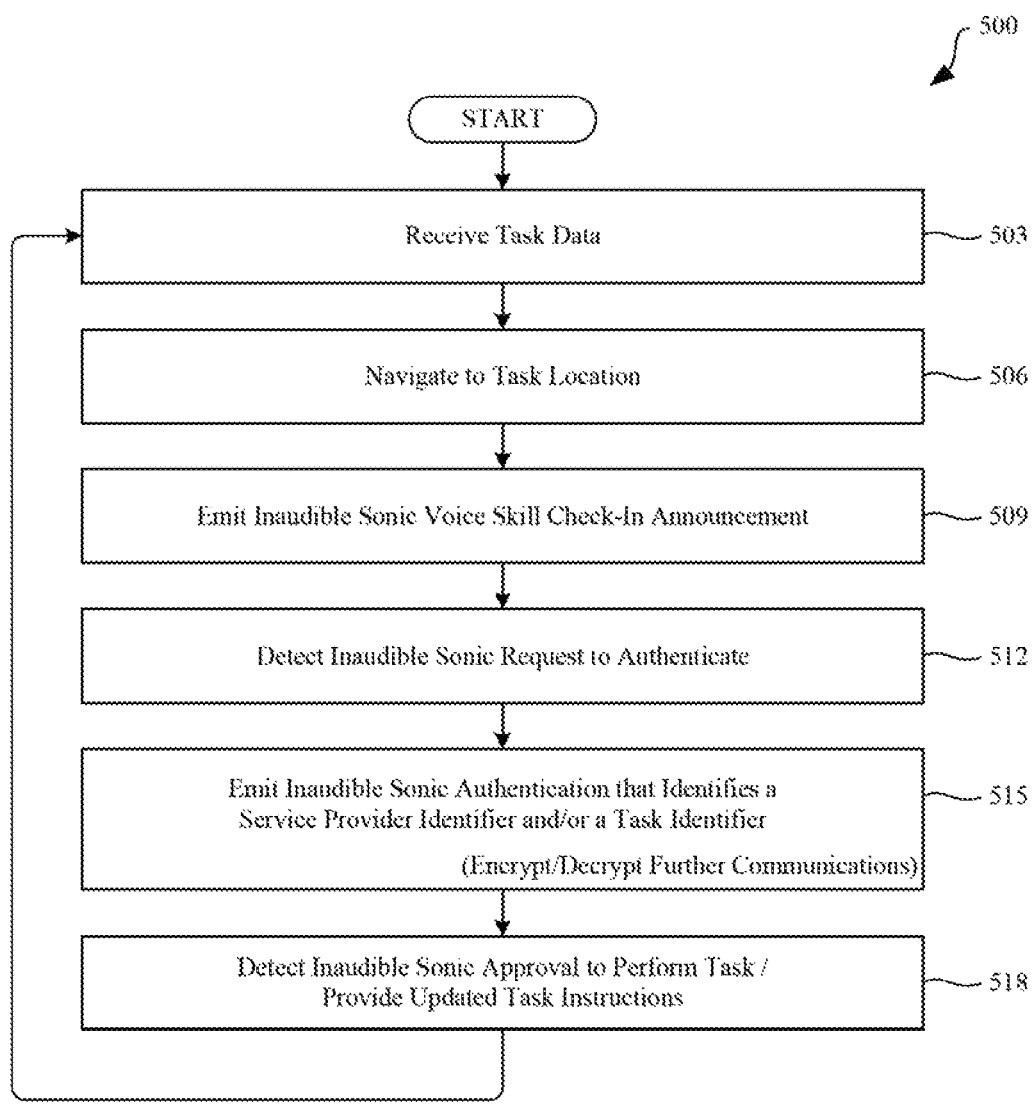
FIG. 5 is another flowchart outlining functionalities implemented by the service device and other components of the networked environment.

FIG. 5 shows an example flowchart 500 describing steps that can be performed by the check-in application 159 of the service device 109. The flowchart 500 outlines how the check-in application 159 interacts with the other components of the networked environment 100 to provide dynamic on-site service management and task performance.

In step 503, the check-in application 159 can receive task data 169. In examples where the service device 109 is managed by the workflow service 120, the check-in application 159 can receive task data 169 from the workflow service 120. In other scenarios the check-in application 159 can receive task data 169 from the network service 160 directly. The task data 169 can include a task identifier 172, task instructions 175, and a service encryption key 178.

In step 506, the check-in application 159 can cause the service device 109 to navigate to a task location, or provide instructions for a user to navigate to the task location. The task location can include a check-in location for the task. The task instructions 175 can specify the check-in location and navigation instructions for the service device 109 to navigate to the check-in location. In some cases, the check-in application 159 or other instructions executed by the service device 109 can generate navigation instructions or retrieve navigation instructions based on the check-in location. The check-in location can be an accessible location nearby to the known location of a voice-activated device 106.

In step 509, the check-in application 159 can cause the service device 109 to emit an inaudible sonic check-in announcement. The service device 109 can emit the inaudible sonic check-in announcement once it is in a predetermined check-in location specified in the task instructions 175. The voice-activated device 106 can be configured to launch or otherwise initiate a check-in management voice skill 147 in response to detecting the inaudible sonic check-in announcement. As a result, the inaudible sonic check-in announcement can be considered a command to launch the check-in management voice skill 147.

In step 512, the check-in application 159 can detect an inaudible sonic authentication request. The service device 109 can include a microphone or other audio detection device, and can provide detected audio to the check-in application 159. The check-in application 159 or other executable instructions of the service device 109 can be configured to respond to the inaudible sonic authentication request.

In step 515, the check-in application 159 can cause the service device 109 to emit an inaudible sonic authentication message. The check-in application 159 can generate the inaudible sonic authentication message to include a service identifier 166 and a task identifier 172 from the task data 169. The service identifier 166 can be a name of the service provider, or a string or data structure that uniquely identifies the service provider. The task identifier 172 can include a name of the task or a string or data structure that uniquely identifies the task. After this point, the voice-activated device 106 can retrieve the task data 169 including the service encryption key 178. As a result, further inaudible sonic communications can be encrypted and decrypted using the service encryption key 178.

In step 518, the check-in application 159 can detect an inaudible sonic approval to perform the task specified in the task data 169. If the service device 109 is an autonomous device, the check-in application 159 or other instructions executed on the service device 109 can cause the service device 109 to perform the task. If the service device 109 is a client device of a user that performs the task, then the check-in application 159 or other instructions executed on the service device 109 can provide further instructions to the user and indicate a particular task is approved for completion. In some cases, updated task instructions or a command to retrieve updated task instructions can be provided through inaudible sonic communications. If the updated task instructions are to be provided electronically rather than through inaudible sonic communications, then the check-in application 159 can retrieve the updated task instructions from a network location specified in an inaudible sonic communication.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The service devices 109 can include a display upon which a user interface generated by an application 157, check-in application 159, workflow service 120, or another application can be rendered. In some examples, the user interface can be generated with user interface data provided by the computing environment 103. The service devices 109 can also include one or more input/output devices that can include, for example, a capacitive touchscreen or other type of touch input device, fingerprint reader, or keyboard.

Although the workflow service 120, client applications 157, check-in application 159, and other various services and functions described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system. The computer-readable medium can include any one of many physical media, such as magnetic, optical, or semiconductor media. Examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

What is claimed is:

1. A system, comprising:
   at least one computing device comprising at least one processor; and
   at least one memory comprising executable instructions, wherein the instructions, when executed by the at least one processor, cause the at least one computing device to at least:
   detect an inaudible sonic check-in announcement;
   emit an inaudible sonic request for check-in authentication;
   detect an inaudible sonic authentication comprising a service provider identifier for a service provider;
   transmit a task data request to retrieve task data associated with the service provider;
   determine that the inaudible sonic check-in announcement is authentic based on the task data; and
   emit an inaudible sonic approval to perform a task specified in the task data.

2. The system of claim 1, wherein the inaudible sonic authentication comprises a task identifier for a task of the service provider.

3. The system of claim 1, wherein the task data comprises a list of tasks that are available to be performed in association with the inaudible sonic check-in announcement.

4. The system of claim 1, wherein the instructions, when executed by the at least one processor, cause the at least one computing device to at least:
   perform at least one task prerequisite action, wherein the task data specifies the at least one task prerequisite action.

5. The system of claim 4, wherein the at least one task prerequisite action comprises at least one of: generating an audible notification, identifying a user approval, emitting updated instructions, providing access to a secured location associated with the task, and communicating a task request.

6. The system of claim 1, wherein the inaudible sonic check-in announcement is emitted by an autonomous vehicle of the service provider.

7. The system of claim 1, wherein a respective one of the inaudible sonic check-in announcement, the inaudible sonic request for the check-in authentication, and the inaudible sonic approval comprises: an ultrasonic frequency, or an infrasonic frequency.

8. A non-transitory computer-readable medium comprising executable instructions, wherein the instructions, when executed by at least one processor, cause at least one computing device to at least:
   detect an inaudible sonic check-in announcement;
   emit an inaudible sonic request for check-in authentication;
   detect an inaudible sonic authentication comprising a service provider identifier for a service provider;
   transmit a task data request to retrieve task data associated with the service provider;
   determine that the inaudible sonic check-in announcement is authentic based on the task data; and
   emit an inaudible sonic approval to perform a task specified in the task data.

9. The non-transitory computer-readable medium of claim 8, wherein the inaudible sonic authentication comprises a task identifier for a task of the service provider.

10. The non-transitory computer-readable medium of claim 8, wherein the task data comprises a list of tasks that are available to be performed in association with the inaudible sonic check-in announcement.

11. The non-transitory computer-readable medium of claim 8, wherein the instructions, when executed by the at least one processor, cause the at least one computing device to at least:
    perform at least one task prerequisite action, wherein the task data specifies the at least one task prerequisite action.

12. The non-transitory computer-readable medium of claim 11, wherein the at least one task prerequisite action comprises at least one of: generating an audible notification, identifying a user approval, emitting updated instructions, providing access to a secured location associated with the task, and communicating a task request.

13. The non-transitory computer-readable medium of claim 8, wherein the inaudible sonic check-in announcement is emitted by an autonomous vehicle of the service provider.

14. The non-transitory computer-readable medium of claim 8, wherein a respective one of the inaudible sonic check-in announcement, the inaudible sonic request for the check-in authentication, and the inaudible sonic approval comprises: an ultrasonic frequency, or an infrasonic frequency.

15. A method performed by at least one computing device based on instructions executed by at least one processor of the at least one computing device, the method comprising:
    detecting an inaudible sonic check-in announcement;
    emitting an inaudible sonic request for check-in authentication;
    detecting an inaudible sonic authentication comprising a service provider identifier for a service provider;
    transmitting a task data request to retrieve task data associated with the service provider;
    determining that the inaudible sonic check-in announcement is authentic based on the task data; and
    emitting an inaudible sonic approval to perform a task specified in the task data.

16. The method of claim 15, wherein the inaudible sonic authentication comprises a task identifier for a task of the service provider.

17. The method of claim 15, wherein the task data comprises a list of tasks that are available to be performed in association with the inaudible sonic check-in announcement.

18. The method of claim 15, further comprising:
performing at least one task prerequisite action, wherein the task data specifies the at least one task prerequisite action.

19. The method of claim 18, wherein the at least one task prerequisite action comprises at least one of: generating an audible notification, identifying a user approval, emitting updated instructions, providing access to a secured location associated with the task, and communicating a task request.

20. The method of claim 19, wherein the inaudible sonic check-in announcement is emitted by an autonomous vehicle of the service provider.

* * * * *